(12) United States Patent
Chang et al.

(10) Patent No.: US 7,466,859 B2
(45) Date of Patent: Dec. 16, 2008

(54) CANDIDATE LIST ENHANCEMENT FOR PREDICTIVE TEXT INPUT IN ELECTRONIC DEVICES

(75) Inventors: Ying Y. Chang, Palo Alto, CA (US); Manjirnath A. Chatterjee, SanFrancisco, CA (US); Robert M. Harman, Palo Alto, CA (US)

(73) Assignee: Motorola, Inc., Schaumburg, IL (US)

( * ) Notice: Subject to any disclaimer, the term of this patent is extended or adjusted under 35 U.S.C. 154(b) by 939 days.

(21) Appl. No.: 11/026,817

(22) Filed: Dec. 30, 2004

(65) Prior Publication Data

US 2006/0146028 A1 Jul. 6, 2006

(51) Int. Cl.
*G06K 9/00* (2006.01)
*H03M 11/00* (2006.01)
*G09G 5/00* (2006.01)

(52) U.S. Cl. .................................. 382/181; 341/22
(58) Field of Classification Search ................. 382/181, 382/188, 189, 195, 214, 217, 218, 254; 455/464; 379/355.05; 715/773, 810; 345/168, 169; 341/22, 23

See application file for complete search history.

(56) References Cited

U.S. PATENT DOCUMENTS

| | | | | |
|---|---|---|---|---|
| 5,128,672 A | * | 7/1992 | Kaehler | 341/23 |
| 5,797,098 A | | 8/1998 | Schroeder et al. | |
| 6,204,848 B1 | | 3/2001 | Nowlan et al. | |
| 7,215,258 B2 | * | 5/2007 | Wormald | 341/23 |
| 7,218,781 B2 | * | 5/2007 | van Meurs | 382/185 |
| 7,324,091 B2 | * | 1/2008 | Fyke | 345/168 |
| 7,382,359 B2 | * | 6/2008 | Griffin | 345/169 |
| 7,417,564 B2 | * | 8/2008 | Tolonen et al. | 341/22 |
| 2004/0183833 A1 | | 9/2004 | Chua | |

FOREIGN PATENT DOCUMENTS

WO   WO 02/33527 A2   4/2002

* cited by examiner

*Primary Examiner*—Amir Alavi
(74) *Attorney, Agent, or Firm*—Roland K. Bowler, II

(57) ABSTRACT

A method in a portable electronic device (100) including inputting a first word component, for example, a letter or stroke, displaying a first candidate list having at least a first completion candidate including the first word component, inputting a second word component, displaying a second candidate list having a second completion candidate, the second completion candidate including the first and second word components, and de-prioritizing the first completion candidate of the first candidate list relative to at least one other candidate of the second candidate list.

21 Claims, 4 Drawing Sheets

| 4131234123413251 | |
|---|---|
| ヽ | 4 |
| ー | 1 |
| J | 3 |
| ー | 1 |
| l | 2 |
| J | 3 |
| ヽ | 4 |
| ー | 1 |
| l | 2 |
| J | 3 |
| ヽ | 4 |
| ー | 1 |
| J | 3 |
| l | 2 |
| フ | 5 |
| ー | 1 |

FIG 4

| 4131234123413251 | |
|---|---|
| ヽ | 4 |
| 一 | 1 |
| ノ | 3 |
| 一 | 1 |
| ｜ | 2 |
| ノ | 3 |
| ヽ | 4 |
| 一 | 1 |
| ｜ | 2 |
| ノ | 3 |
| ヽ | 4 |
| 一 | 1 |
| ノ | 3 |
| ｜ | 2 |
| ㄱ | 5 |
| 一 | 1 |

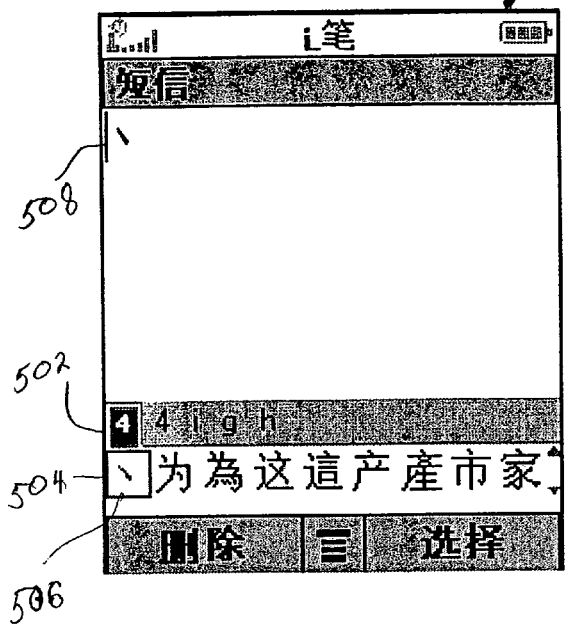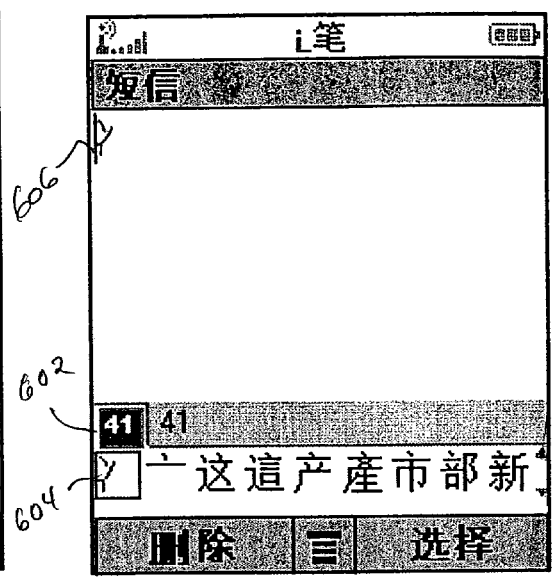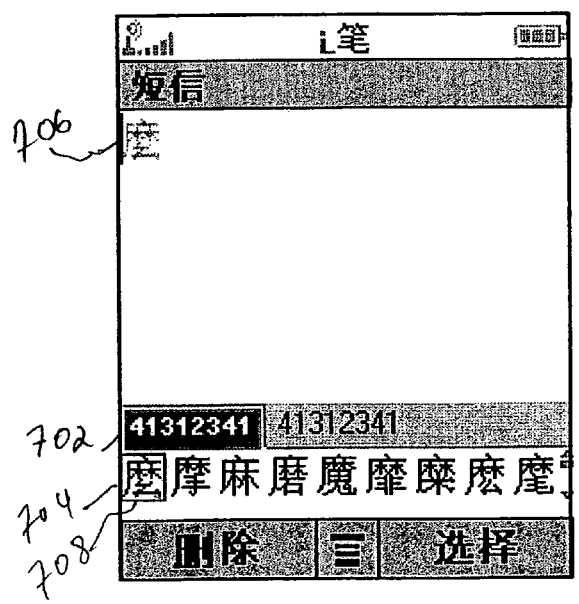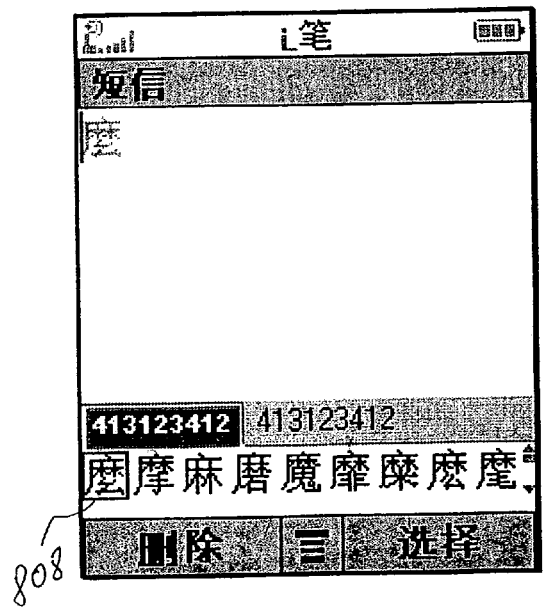

CANDIDATE LIST ENHANCEMENT FOR PREDICTIVE TEXT INPUT IN ELECTRONIC DEVICES

FIELD OF THE DISCLOSURE

The present disclosure relates generally to electronic devices capable of receiving text input, and more particularly to predictive text input schemes in such devices, for example, in portable wireless communications devices, and corresponding methods.

BACKGROUND OF THE DISCLOSURE

The use of predictive text entry to speed up input on cellular telephones and other devices having keypads with reduced keys is known generally. U.S. Pat. No. 5,797,098 entitled "User Interface For Cellular Telephone", for example, discloses a predictive text entry method that displays characters most likely to occur after entry of a first character. U.S. Pat. No. 5,797,098 also discloses displaying candidate words matching initial characters input by a user and assigning the candidate words to corresponding programmable keys, which may be pressed to select the candidate word.

The various aspects, features and advantages of the disclosure will become more fully apparent to those having ordinary skill in the art upon careful consideration of the following Detailed Description thereof with the accompanying drawings described below.

BRIEF DESCRIPTION OF THE DRAWINGS

FIG. 4 illustrates exemplary Chinese character strokes input by a sequence of numeric inputs.

FIG. 5 is a visual interface displaying predicted completion symbols.

FIG. 6 is a visual interface displaying predicted, completion symbols.

FIG. 7 is a visual interface displaying predicted completion symbols.

FIG. 8 is a visual interface displaying predicted completion symbols.

DETAILED DESCRIPTION

Figure 1:
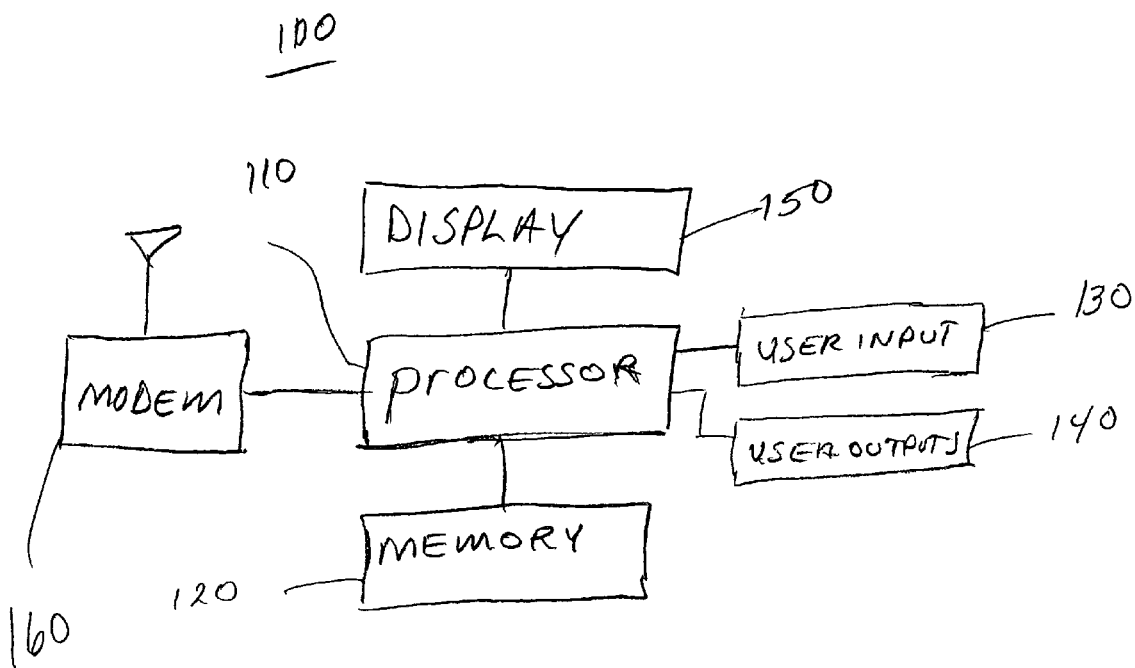
FIG. 1 illustrates an exemplary device to which text is input.

FIG. 1 illustrates an electronic device capable of text input or entry in the exemplary form of a handheld wireless communication device 100, for example, a cellular or cordless telephone handset, or a wireless enabled person digital assistant (PDA), or a one or two-way paging device. In other embodiments, the electronics device does not include wireless communications capability. Alternatively, the device may be a personal organizer, multimedia player, audio and video recording device, laptop or notebook computer, among other portable devices. More generally, the electronic device is any device capable of text input or entry.

In FIG. 1, the exemplary electronic device comprises generally a processor 110, for example, a controller and/or a digital signal processor (DSP). The processor is communicably coupled to memory 120, which may include, though is not limited to, RAM, ROM, EPROM, removable memory, etc. In some embodiments, operation of the device is controlled at least partly by a program stored in memory.

In FIG. 1, the processor is also communicably coupled to one or more user inputs 130. In one embodiment, the user input includes a touch-screen display responsive to input from a stylus, finger or other device. In another embodiment the user input includes a keypad. The keypad may be a full QWERTY keypad or a keypad having a reduced number of keys, for example, an alphanumeric keypad typically found on cellular telephone handsets capable of inputting numerals and alphabetic text, possibly in combination with other function keys. The user input may also include other input devices including, but not limited to, microphones, joysticks, pointers, voice recognition capability, gesture recognition capability, etc. These and other user inputs may be used alone and in various combinations for inputting text and more generally for inputting characters or components that constitute words, symbols, code, etc.

In FIG. 1, the exemplary device also includes user outputs 140 including, but not limited to, audio and other outputs communicably coupled to the processor. The exemplary device also includes a video display 150, for example, an LCD or other flat panel display device. In embodiments that include a touch-screen input device, the touch-screen may be integrated with the visual display as is known generally.

In FIG. 1, the exemplary electronic device also includes a modem 160 capable of wireless communications. In one embodiment, the modem 160 supports a cellular communication protocol, for example, the Global System for Mobile Communications (GSM) protocol, the $3^{rd}$ Generation (3G) Universal Mobile Telecommunications System (UMTS) W-CDMA protocol, or one of the several CDMA protocols, among other present and future cellular communication protocols. Alternatively, the modem may be compliant with some other wireless communication protocol including, but not limited to, local area network protocols, like IEEE 802.xx, personal area network protocols like Bluetooth, and wide area network protocols, among others. In other embodiments, the modem is a short range wireless modem, for example, a DECT or other cordless telephone protocol compliant modem. Alternatively, the modem may be a wire-line modem. Although the exemplary text device includes a modem, more generally, electronic devices capable of text input do not require a transmitter and/or receiver.

In one embodiment, the electronic device is capable of receiving text input via a user input thereof, examples of which were discussed above. Exemplary text includes, but is not limited to, Roman alphanumeric characters as well as Chinese, Japanese, Korean and other character strokes. Characters are generally components of words, symbols, code, etc. Symbol components are also referred to as character strokes or strokes. Character combinations form words and/or symbols depending on the particular character type and/or language with which the characters are associated. A combination of Roman characters may be embodied as a character string forming a word or words. In other embodiments, a combination of characters or strokes may be embodied as a Chinese, or Japanese, or Korean or other symbol type.

In some embodiments, the characters are input at the user input, for example, by input keys, or by entering strokes on a touch-screen, or by some other input means. The instant disclosure is not limited to any particular device or means for inputting text. In some embodiments where the electronic device includes a display, characters or strokes input to the device may be visually presented to the user on the display as they are input, examples of which are discussed further below.

Though in other embodiments, the characters input are not necessarily presented to the user as the characters are input to the device.

In one embodiment, a first list having one or more completion candidates is generated in response to the first word component, or character, input to or received by the electronic device. A completion candidate is a completed word, symbol, code, etc. containing the word component or combination of characters or strokes input to the electronic device. In one embodiment, the completion candidates, or completions, are completed words or symbols predicted most likely to match a partially input word or partially input symbol. Generally, the list of one or more completion candidates will change dynamically as additional characters or strokes are input to the device as discussed further below. In one embodiment, the generation of the completion list is implemented by a software controlled processor, although it could also be implemented in hardware alternatively.

In some embodiments, one or more completion candidates of the completion list are presented visually to the user at the visual interface of the device as characters are input to the device. Generally, the completion list changes as each new character is input. Also, the number of completion candidates displayed may be less than the number of completion candidates generated for a particular character combination input to the device. Thus in some embodiments the completions displayed are those most likely to match the word or symbol being input as discussed further below.

In some embodiments where multiple completion candidates are generated for a particular character input, at least some of the completion candidates are ordered or otherwise arranged based on ordering criteria, for example, based on the likelihood that the completion candidate matches a predicted completion of the input character combination, and/or based on alphabetic ordering, and/or based on probability modeling of historical input information, or other criteria. The disclosure is not intended to be limited to any particular criteria for ordering completion candidates in the completion list. Exemplary embodiments are discussed below.

Figure 2:
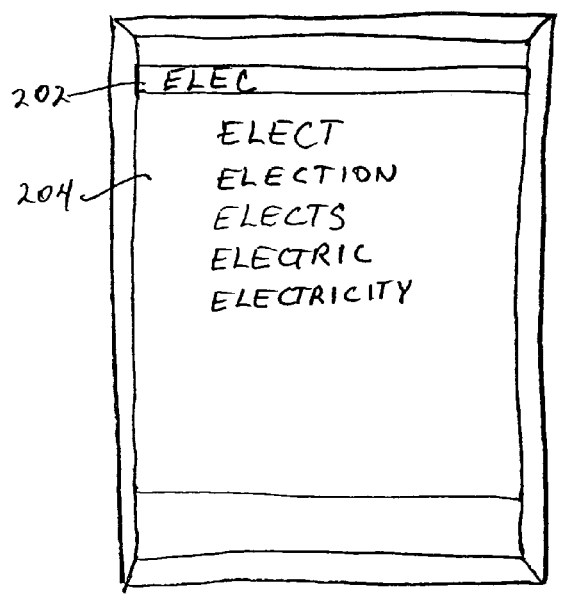
FIG. 2 illustrates an exemplary completion candidate list for a corresponding character combination input.

In FIG. 2, a visual display 200 of the electronic device displays a Roman character combination or string "ELEC" 202 input to the device. Another display portion 204 visually presents an exemplary completion list generated based on the input character combination "ELEC". Generally, completion lists may also have been generated for predecessor character combinations input to the device, for example, for the characters and/or combinations "E", "EL", "ELE". The completion lists change dynamically as additional characters are input to the device. In some embodiments a completion list may not be generated or presented until a combination of two or more characters are input, since the number of possible matches for a single character may be very large. Generally however large potential completion lists may be reduced based on historical data, neighboring words or symbols, and other schemes.

In FIG. 2, the exemplary completion candidates in the completion list 204 all include the input character combination "ELEC". The displayed completion candidates are: "ELECT", "ELECTION", "ELECTS", "ELECTRIC", and "ELECTRICITY". In other embodiments, the number of completion candidates displayed may be may be more or less. The completion candidate list may generally include more candidates than the number of candidates displayed. Thus, generally, the displayed completion candidate list may be a subset of a total number of possible completion candidates. As suggested, for example, the displayed completion list may be a subset of completions most likely to match the word or symbol being input.

If one of the completion candidates matches the word or symbol being input, the user may discontinue the input process before inputting all characters and select the matched completion from the completion list. For example, the user may scroll the completion list and select the matched candidate. The selection may be performed by any one of a number of input devices, for example, with a scrolling cursor and selection functionality. In embodiments where only a single completion candidate is listed, the user may merely select the matching completion candidate. Also, in some embodiments, the completion on which the cursor is positioned is displayed, whereupon the user may select the displayed word or symbol using some functionality of the device, for example, by depressing a select or enter key. In some embodiments, a property, for example, color or contrast, of the displayed word or symbol indicates whether or not it has been selected. The different candidates may thus be displayed by scrolling the list of candidates, though a candidate is not selected until a selection function is invoked by the user.

Figure 3:
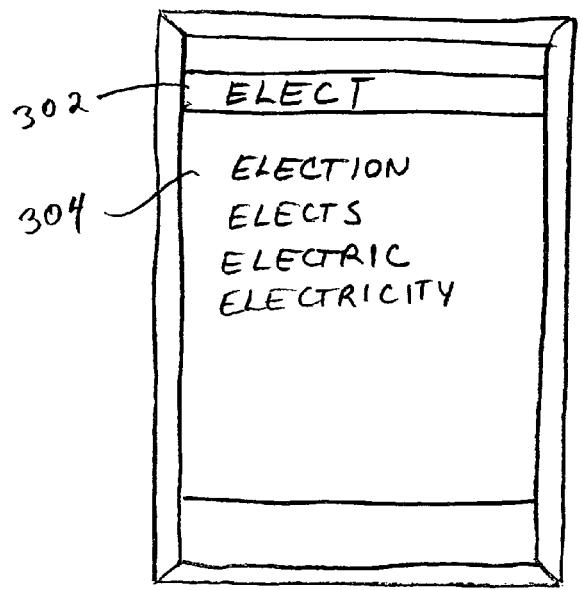
FIG. 3 illustrates another exemplary completion candidate list for a corresponding character combination input.

If none of the completion candidates in the list is a match, the user continues inputting additional characters. As suggested above, the completion list changes dynamically for each character input. In FIG. 3, at 302, the next character input is Roman letter "T", which creates the Roman letter character string "ELECT". At 304, the displayed completion candidates are: "ELECTION", "ELECTS", "ELECTRIC", and "ELECTRICITY". As noted, the number of candidates displayed may be more or less and may not necessarily correspond to the number of candidates actually generated. The revised completion list comprises completion candidates, all of which include the input character combination "ELECT".

In FIG. 3, at 304, the exemplary completion list does not include the completion candidate "ELECT", although the excluded term includes all characters of the input character combination "ELECT" at 302. In FIG. 2, the completion "ELECT" was included in the predecessor list at 204 for the input combination "ELEC" at 202. Because the completion "ELECT" was not selected when it was offered initially, it is not likely a match, although it is possible that it was overlooked by the user. Thus more generally, since the completion "ELECT" was not selected as a match for the input character combination "ELEC", the completion candidate "ELECT" may be de-prioritized relative to other completion candidates in the list. Examples of de-prioritization are discussed further below.

In some embodiments, de-prioritizing a first completion candidate includes excluding the first completion candidate from a subsequently generated list and/or not displaying the first candidate with other candidates on the subsequently generated word list. De-prioritizing may also include ordering the presentation of the first completion candidate after other completion candidates in the subsequently generated candidate list. The de-prioritized candidate may also be ordered after other candidates where the candidates are visually presented on the display. In FIG. 3, for example, the candidate "ELECT" may be located toward or at the bottom of the list near or after the candidate "ELECTRICITY".

FIG. 4 illustrates an exemplary symbol matching embodiment. In FIG. 4, exemplary Chinese characters or strokes are input by a sequence of numeric inputs (4131234123413251), which may result from depression of keys on a numeric keypad or the audible enunciation of the numbers. The exemplary mapping of Chinese strokes to numeric keys corresponds to the standard adopted by the Peoples Republic of China (PRC). In other embodiments, however, strokes are mapped to different input keys. For example, the exemplary Chinese strokes may be mapped to different alphanumeric keys, and other character strokes, i.e., Japanese and Korean strokes, may be mapped to alpha and/or numeric input keys.

FIG. 5 illustrates a visual interface 500 for an electronics device in the exemplary form of a wireless communication handset. To input the Chinese symbol corresponding to the numerical sequence in FIG. 4, the user first inputs the number "4", which corresponds to a constituent stroke of a desired symbol. In the exemplary embodiment of FIG. 5, the sequence of numeric key inputs is displayed along a lower portion 502 of the visual interface. In FIG. 5, upon inputting the first number, one or more predicted completion symbols are displayed along a lower portion 504 of the display. The completions may be arranged in an order based on the likelihood of a match or based upon some other criteria. In FIG. 5, the user may scroll a cursor 506 to highlight and select one of the completions. The highlighted completion is also displayed on the visual interface adjacent a cursor 508. Thus scrolling across the list of predicted completions will cause the highlighted completion to be displayed. A highlighted completion may be selected by inputting a select command of the device. In one embodiment, the most likely match is highlighted initially. In FIG. 5, the exemplary visual interface, or display, includes signal strength and battery charge level indicators, among other information typical of wireless handset user interfaces, but these other indicia are not relevant to the more general teachings of the disclosure.

In FIG. 6, continuing with the input of the Chinese symbol corresponding to the numerical sequence in FIG. 4, after inputting the "4", the user next inputs the number "1". The input of the subsequent numeral "1" is indicated at the lower portion 602 of the display. A revised list of predicted symbol completions is displayed at 604, and the highlighted completion symbol is displayed adjacent the cursor 606. The user may also navigate the displayed completion symbol list and select a match. If there is no match, the user proceeds to input additional strokes.

In FIG. 7, after inputting character strokes corresponding to number string "4131234", the user next inputs a "1" illustrated along the lower portion 702 of the display, and a revised list of predicted completion symbols is displayed along the portion 704 of the display. The highlighted symbol is displayed adjacent the cursor 706, wherein the user may highlight and selected any one of the predicted completions. In FIG. 8, upon inputting the next numeral "2", the list of predicted completions includes one of the same completions in the list of FIG. 7. Particularly, the highlighted symbol 708 in FIG. 7 is the same as the highlighted symbol 808 in FIG. 8.

In one embodiment, since the highlighted symbol 808 in FIG. 8 was already offered earlier, when inputting numeral "1" in FIG. 7, it may be unnecessary to include or display the same completion in the latter step corresponding to FIG. 8. Alternatively, the previously displayed completion could be de-prioritized, for example, in a manner that maintains its availability for future selection in the event that it was previously overlooked. For example, if the most probable completions are on the left side of the list and least probable completions on the right side, the previously displayed completion could be de-prioritized by moving it toward the right side of the completion list. More generally, multiple completions may be de-prioritized or excluded from subsequent completion lists. Thereafter, the input process continues until a completion matching the desired symbol is generated and selected.

While the present disclosure and what are presently considered to be the best modes thereof have been described in a manner establishing possession by the inventors and enabling those of ordinary skill in the art to make and use the same, it will be understood and appreciated that there are many equivalents to the exemplary embodiments disclosed herein and that modifications and variations may be made thereto without departing from the scope and spirit of the inventions, which are to be limited not by the exemplary embodiments but by the appended claims.

What is claimed is:

1. A method in an electronic device, the method comprising:
    inputting a character combination including at least one character at a user interface of the electronic device;
    generating a first word list having at least a first completion candidate including the character combination;
    adding an additional character to the character combination;
    generating a second word list having at least a second completion candidate including the character combination with the additional character;
    de-prioritizing the first completion candidate relative to the second completion candidate of the second word list.

2. The method of claim 1, de-prioritizing the first completion candidate by excluding the first completion candidate from the second word list.

3. The method of claim 2, excluding the first completion candidate from the second word list when the first completion candidate includes the character combination with the additional character.

4. The method of claim 1,
    the second word list includes the first completion candidate,
    displaying the second completion candidate of the second word list, de-prioritizing the first completion candidate by not displaying the first completion candidate.

5. The method of claim 4, de-prioritizing the first completion candidate when the first completion candidate includes the character combination with the additional character.

6. The method of claim 1,
    the second word list includes the first completion candidate,
    de-prioritizing includes ordering the presentation of the first completion candidate after the second completion candidate when generating the second word list.

7. The method of claim 1,
    ordering at least some completion candidates of the first word list based on a likelihood that the completion candidates of the first word list match a predicted completion including the input character combination.

8. The method of claim 1,
    displaying at least some completion candidates of the second word list on a visual display,
    scrolling among and selecting one of the displayed completion candidates.

9. The method of claim 8,
    displaying one of the completion candidates on another portion of the visual display before selecting any of the completion candidates, a property of the completion candidate displayed on another portion of the visual display indicative of whether a selection has been made.

10. A method in a portable electronic device, the method comprising:
  inputting a first word component at a user interface;
  displaying a first candidate list having at least a first completion candidate including the first word component;
  inputting a second word component at the user interface;
  displaying a second candidate list having a second completion candidate, the second completion candidate including the first and second word components;
  de-prioritizing the first completion candidate relative to at least one other candidate of the second candidate list.

11. The method of claim 10, de-prioritizing the first completion candidate when the first completion candidate includes the second word component.

12. The method of claim 10, de-prioritizing the first completion candidate includes excluding the first completion candidate from the displayed second candidate list.

13. The method of claim 10, de-prioritizing the first completion candidate includes ordering presentation of the first completion candidate after presentation of the second completion candidate when displaying the second candidate list.

14. The method of claim 10, ordering at least some completion candidates of the first and second candidate lists based on likelihood that the ordered completion candidates will match a predicted completion.

15. The method of claim 10,
  inputting the first and second word components includes inputting first and second character symbols,
  the first and second character symbols forming a symbol combination.

16. The method of claim 10,
  inputting the first and second word components includes forming a character combination having a string of first and second Roman letters.

17. A handheld electronic device comprising:
  a user input;
  a processor coupled to the user input;
  a display coupled to the processor,
  the processor generating a first list having at least a first completion candidate including a first word component in response to the first word component input at the user input,
  the processor generating a second list having at least a second completion candidate in response to a second word component input at the user input, the second completion candidate including the first word component and the second word component,
  the processor de-prioritizing the first completion candidate relative to the second completion candidate.

18. The device of claim 17, the processor de-prioritizing the first completion candidate by excluding the first completion candidate from the second list.

19. The device of claim 18, the first completion candidate excluded from the second list includes the second word component.

20. The device of claim 17, the user input is a keypad having a reduced number of keys, at least some of the keys capable of inputting more than one word component.

21. The device of claim 17, the display visually presenting the first and second lists to the user.

* * * * *